United States Patent [19]

Hoecker

[11] Patent Number: 4,881,506
[45] Date of Patent: Nov. 21, 1989

[54] INJECTION PUMP WITH PREINJECTION

[75] Inventor: Manfred Hoecker, Rosrath, Fed. Rep. of Germany

[73] Assignee: Kloeckner-Humboldt-Deutz AG, Fed. Rep. of Germany

[21] Appl. No.: 204,594

[22] Filed: Jun. 9, 1988

[30] Foreign Application Priority Data

Jun. 10, 1987 [DE] Fed. Rep. of Germany ....... 3719253
Feb. 10, 1988 [DE] Fed. Rep. of Germany ....... 3804018

[51] Int. Cl.⁴ .................... F02F 39/00; F02F 39/28
[52] U.S. Cl. .............................. 123/503; 123/500; 417/494
[58] Field of Search .............. 123/503, 500, 501, 449, 123/323, 495, 179 L; 417/494, 499, 289

[56] References Cited

U.S. PATENT DOCUMENTS

| 2,159,177 | 5/1939 | Ricardo | 123/501 |
| 2,565,681 | 8/1951 | Fleck | 123/501 |
| 3,435,811 | 4/1969 | Guertler | 123/503 |
| 3,677,256 | 7/1972 | Regneault | 123/503 |
| 4,013,055 | 3/1977 | Sommer | 123/500 |
| 4,448,167 | 5/1984 | Schmid | 123/503 |
| 4,737,086 | 4/1988 | Yamaguchi | 123/503 |

FOREIGN PATENT DOCUMENTS

| 1909255 | 9/1969 | Fed. Rep. of Germany | 123/500 |
| 0133346 | 12/1978 | German Democratic Rep. | 123/503 |
| 514011 | 10/1939 | United Kingdom | 123/503 |

Primary Examiner—Carl Stuart Miller
Attorney, Agent, or Firm—Charles L. Schwab

[57] ABSTRACT

The injection pump provides preinjection only during engine idling and partial load. This is achieved by providing a main release opening and an auxiliary release opening in the pump cylinder which appropriately register with first and second release grooves in a pump plunger which is rotatable between full load and low idle positions.

22 Claims, 7 Drawing Sheets

INJECTION PUMP WITH PREINJECTION

TECHNICAL FIELD

This invention relates to an injection pump for internal combustion engines and more particularly to an injection pump capable of delivering a preinjection quantity of fuel.

PRIOR ART STATEMENT

In modern diesel internal combustion engines, especially those with a direct injection process and exhaust gas turbo supercharging, combustion noises reach their highest values in the vicinity of approximately 30% of full load.

The ratio of fuel quantity at full load to fuel quantity at idle is particularly great with supercharged engines. The injection equipment is designed primarily to meet fuel delivery needs in the high load range of the engine. This results in a relatively high injection rate for the lower load range as well, and thus the injection quantity is too great for the long ignition lag time which predominates in this range. The result is an initiation of combustion with very steep combustion pressure gradients and a correspondingly high incidence of combustion noise. In order to achieve a relatively quiet combustion, only a specific limited amount of fuel may be introduced within the ignition lag time. This can be achieved by injecting the necessary amount of fuel in the critical load range in two partial quantities which are injected at specific spaced intervals. Because of consumption and emission considerations, it is desired that the injection process in the upper load range remain unchanged. In addition, it is recognized that ignition lag times at high and low speeds are different and should be taken into consideration in development of an injection system having preinjection.

U.S. Pat. No. 2,565,681, which shows a conventional injection pump, recommends the use of a second release groove in the pump plunger. However, it has been proven through testing that engines which are operated with this type of injection pump emit a high level of noise, especially in the lower partial load range.

OBJECT OF THE INVENTION

It is a primary object of the invention to provide a simple means to reduce the noise emission level of an internal combustion engine which is operated with an injection pump, especially while idling in the lower or partial load range, without having an adverse effect on full load range operation of the engine.

BRIEF SUMMARY OF THE INVENTION

For hydraulic reasons the injection quantity for a uniform geometrical injection stroke is less at low speeds than at high speeds. For this reason a specific injection quantity at a low speed requires a greater geometric injection stroke, i.e., a greater rotation of the pump plunger, than at a higher speed. This relationship is in effect in the same way for the preinjection quantity as well. Therefore, the upper edge of the second release groove must be inclined in the same way as the upper edge of the first release groove. An optimum adaption to the design of the injection process which is necessary for quiet combustion is achieved in the present invention by inclining the upper edge of the second release groove relative to the pump plunger upper edge at an angle which is between one-half the angle of the first release groove upper edge relative to the pump plunger upper edge and an angle which is greater by 6 degrees.

The end of the second release groove may be constructed to provide a gradual transition from the injection which is interrupted during partial load to the uninterrupted injection at full load, thus insuring good engine control.

Forming the end of the second release groove in a sloping edge offers the advantage of simple fabrication, while forming the end in a curve provides a particularly sensitive modulation of the control behavior of the engine.

The second release groove may have a constant width, in which case interruption time of the injection decreases with increasing speed and adapts in an advantageous way to the injection lag which decreases with increasing engine speed. Dimensioning of the width of the second release groove, which may be 5 to 7 percent of the pump plunger diameter, takes into consideration the need for a longer interruption of injection needed during partial load and at idle.

Dimensioning of the depth of the second release groove insures necessary fuel flow for a sudden release of fuel from the pump chamber for a proper interruption of injection.

The interruption period of the injection may be modified depending upon engine speed and/or the rotated position of the pump plunger, thus providing an additional parameter for modulating the injection.

The release slot in the cylinder casing and the second release groove may be formed by the same tool, which is advantageous both in reworking and initial production of pump plungers and pump cylinders.

The connection of the release slot with the release opening or supply port in the pump cylinder is achieved by a simple reworking of a mass produced pump plunger bushing since regulated fuel can drain off via the release slot into the supply port and thus other modification of the injection pump casing is not necessary.

The arrangement of the release slot perpendicular to the direction of movement of the pump plunger and its location near the highest point of the supply port offers the advantage that initiation of delivery of fuel by the injection pump can be precisely adjusted in accordance with the familiar overflow method and no particular special measures need to be taken relating thereto.

The equal widths of the second release groove and the release slot offers the opportunity to form the release slot and the second release groove in existing components with the same tool.

In the preferred construction of the invention, the release groove and release slot do not communicate with one another when the pump plunger is rotated to its full load position. Thus, there is no interruption of injection in the full load position or setting of the pump plunger and this provides efficient fuel consumption by the engine and low pollution emissions at full load.

The position of the second release groove relative to the upper edge of the plunger insures the required preinjection amount in the low idle setting or position of the pump plunger. Thus, knocking of the diesel engine during idling is substantially eliminated.

A release opening may be formed by drilling a radial release hole in the pump cylinder wall. This is a less expensive way of providing the additional release opening than the forming of a release slot by electro-erosive boring. In addition, such a bore is more tolerant of the different selected angle positions of the second release groove.

The release hole may be circumferentially displaced about 40 degrees from the supply port or opening with its upper edge below the upper edge of the supply port and its diameter may be 8 to 12 percent of the diameter of the pump plunger.

Selection of the diameter of the release borehole and its location relative to the supply port result in reduced engine noise, efficient fuel consumption and low emission values.

In the present invention there is no interruption of injection when the pump plunger is set in its full load position. This results in optimal fuel consumption and low harmful emissions. Slight overlapping of the control areas of the release passages prevents a sudden change in the quantity of fuel injected during the transition from partial load to full load.

By positioning the release borehole so its lower edge is tangent to the upper edge of the second release groove when the pump plunger closes the support port with the pump plunger in its low idle position of adjustment, the necessary preinjection quantity is delivered and idling knocking of the diesel engine is substantially avoided.

BRIEF DESCRIPTION OF THE DRAWINGS

Various embodiments of the invention are illustrated in the drawings, in which.

DETAILED DESCRIPTION OF THE DRAWINGS

Figure 1:
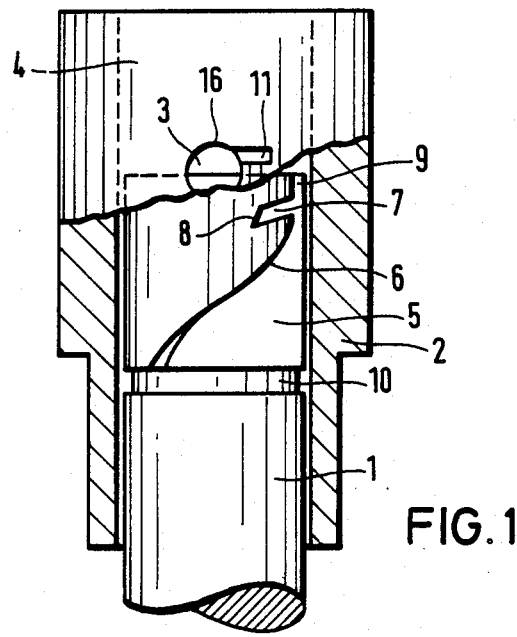
FIG. 1 is a partial side view of one embodiment showing a pump plunger and cylinder with part of the cylinder broken away for illustration purposes and wherein both release grooves are connected to the pump chamber by means of an axial groove.

In FIG. 1 a pump plunger 1 is guided in an axially displaceable or reciprocating manner in a pump cylinder 2. Pump plunger 1 is driven by a cam, not shown, sucks fuel from a supply port 3 and delivers fuel from a pump chamber 4 via delivery apparatus, not shown, which includes a delivery valve and an injector. On the pressure chamber end of the outer cylinder surface of the pump plunger 1 a first release groove 5 with a control edge 6, a second release groove 7 and an axial groove 9 are formed. The axial groove 9 connects pump chamber 4 with an annular groove 10 and release grooves 5 and 7. An auxiliary release opening in the form of a rectangular release slot 11, which is perpendicular to the direction of the movement of the plunger, is formed in pump cylinder 2 so as to be connected to the supply port 3.

Figure 2:
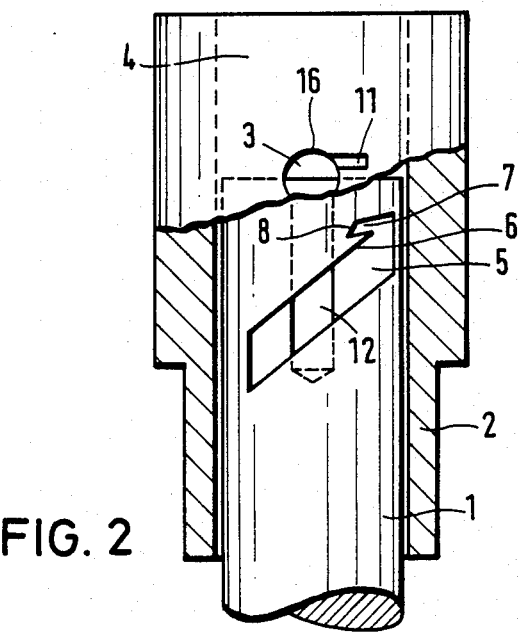
FIG. 2 is a partial side view of a second embodiment showing a pump plunger and a cylinder with a part of the latter broken away to show release grooves in the pump plunger connected with the pump chamber by means of a central borehole.

In FIG. 2 a variation is represented in which the first and second release grooves 5, 7 are connected to the pump chamber 4 by means of a central borehole 12.

Figure 3:
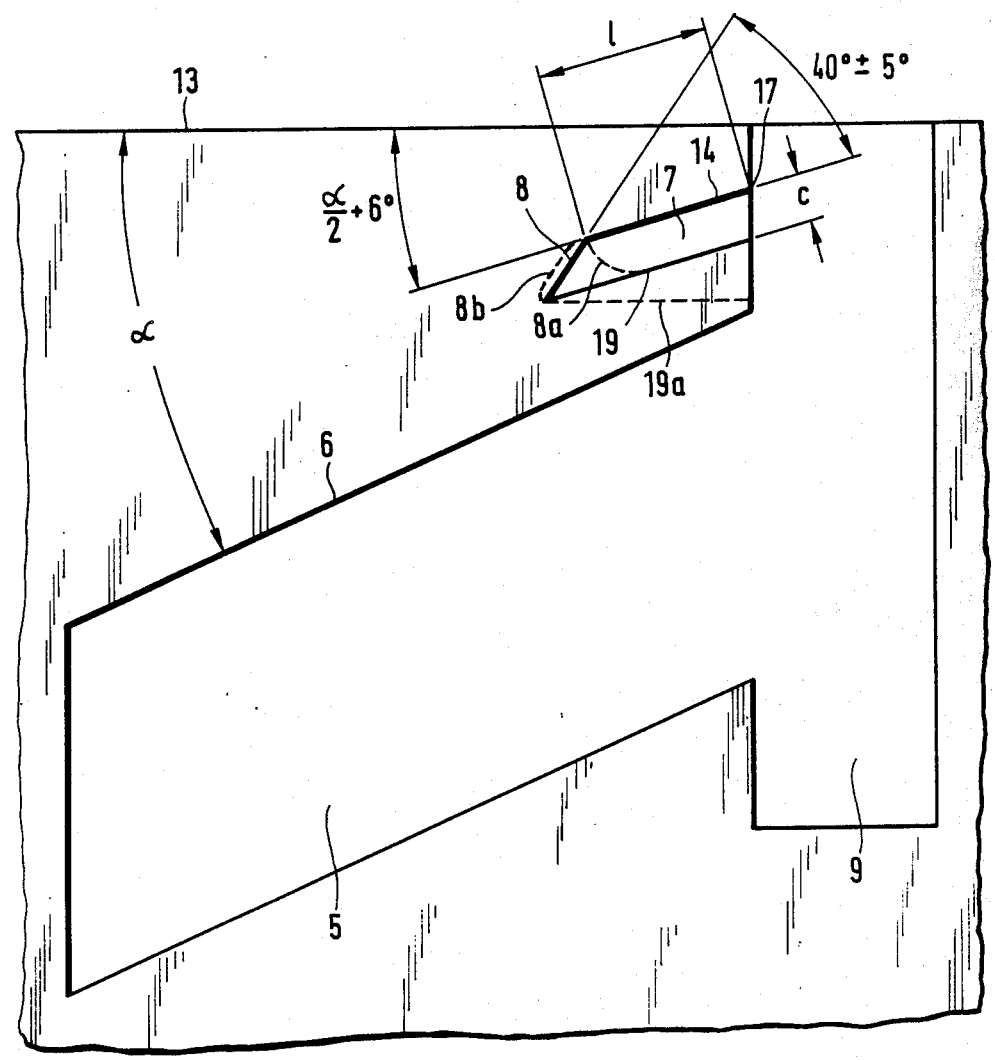
FIG. 3 is an enlarged side view of the pump plunger showing the release grooves and an axial groove formed therein.

The precise dimensions of second release groove are shown in FIG. 3. Relative to the plunger upper edge 13, release groove 7 is inclined at an angle which is not less than one-half the angle of inclination of the control edge 6 relative to the plunger upper edge 13 and not greater than one-half of the angle of inclination of the control edge 6 plus 6 degrees. The width "C" between upper and lower control edges 14 and 19 of second release groove 7 has a value between 5 and 7 percent of the diameter of pump plunger 1.

Second release groove 7 has a discharge outlet or edge 8 which slops downwardly from the upper edge to the lower edge of second release groove 7 at an angle between 35 and 45 degrees to the upper edge.

Variations of the sloped discharge edge 8 are indicated by broken lines 8a and 8b which illustrate curved edges.

Broken lines 19a illustrate an alternate lower leading edge of the second release groove which runs parallel or approximately parallel to pump plunger upper edge 13.

Figure 4:
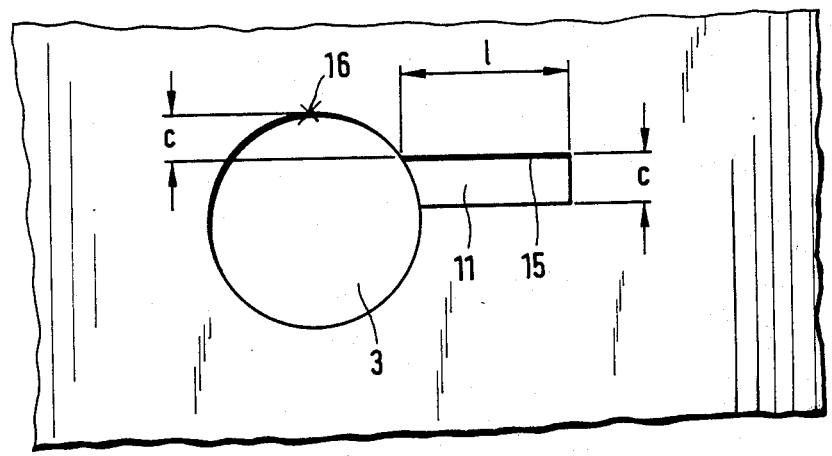
FIG. 4 is an enlarged partial side view of the pump cylinder showing a supply port with a release slot.
Figure 4A:
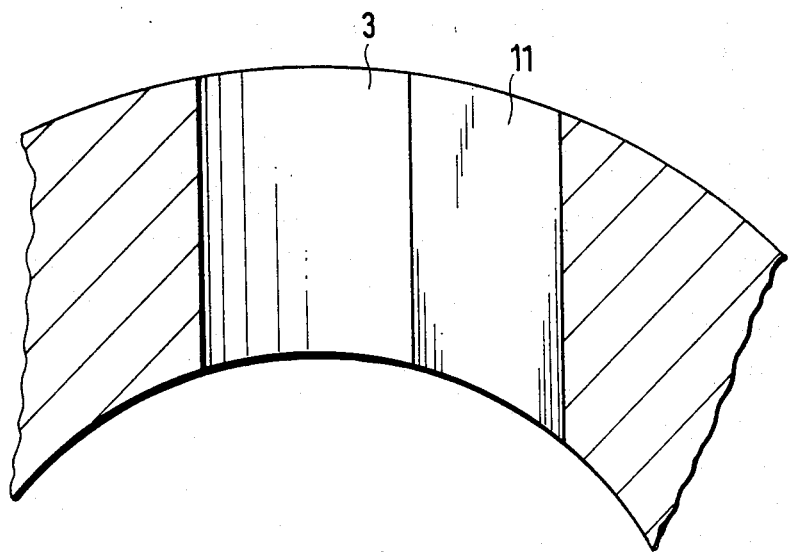
FIG. 4a is a partial cross-section through the pump cylinder showing the supply port and the release slot.

The length "l" of upper leading control edge 14 of second release groove 7 is the same as the length "l" of the upper leading edge 15 of release slot 11. In FIG. 4 and FIG. 4a the supply port or release opening 3 and associated release slot 11 are represented. Release slot 11 has a width "c" which corresponds to the width of second release groove 7. By the same dimension "c", the upper edge 15 of the release slot 11 is spaced below the vertex 16 of the supply port 3.

Figure 5:
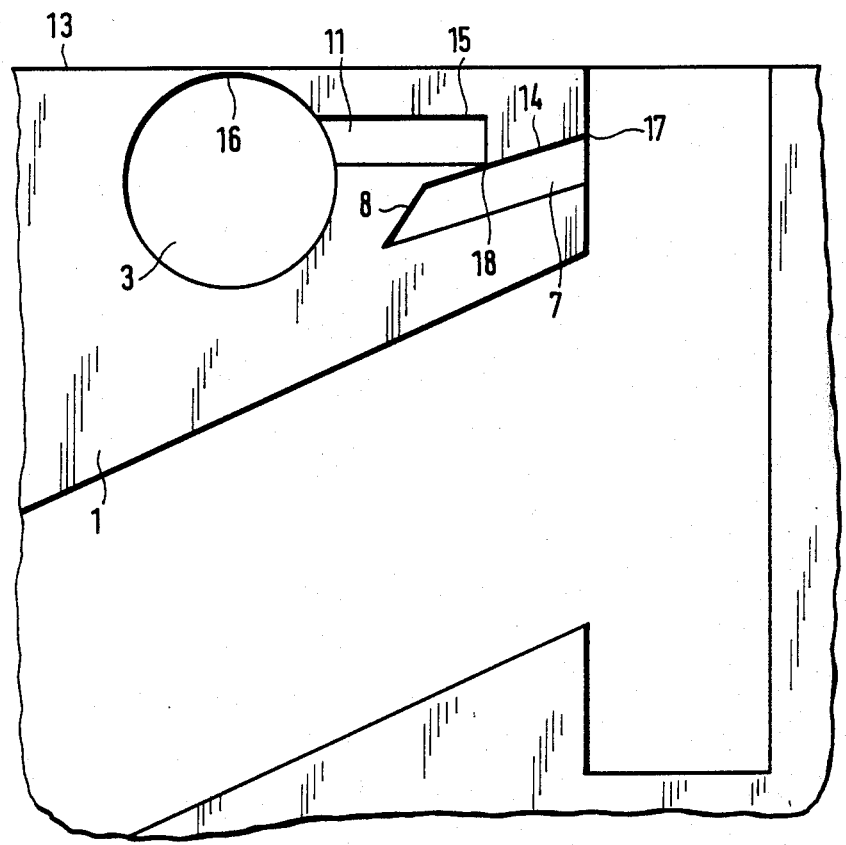
FIG. 5 is an enlarged side view of the pump plunger with the cylinder supply port and its release slot superimposed thereon to show the relative positions of the components at a low idle rotated position of the pump plunger.
Figure 5A:
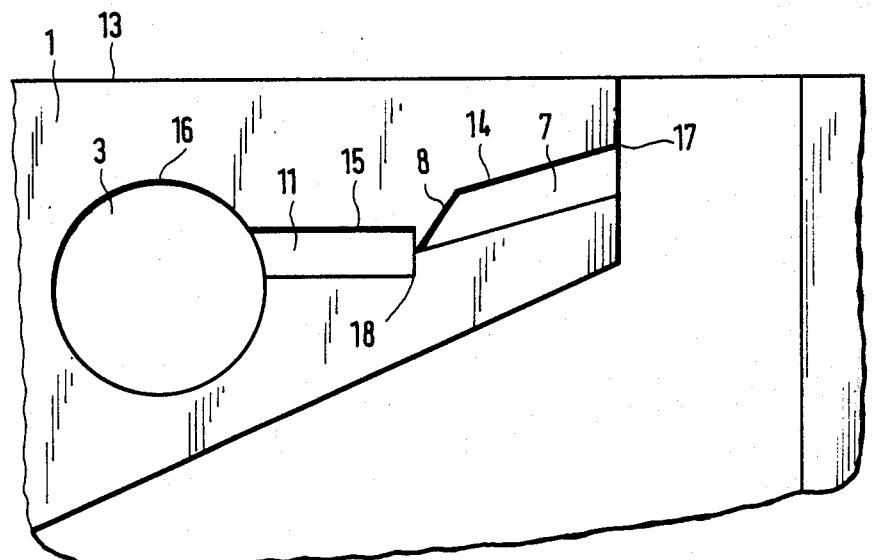
FIG. 5a is similar to FIG. 5 but with the pump plunger rotated to its full load position and somewhat higher in its injection delivery stroke.

Referring to FIGS. 5 and 5a, the spacing of the point 17 of second release groove 7 from plunger upper edge 13 depends upon the angle and vertical position of the second release groove 7 on pump plunger 1 and the position of supply port 3 and release slot 11 in pump cylinder 2. FIG. 5 shows the rotated position of pump plunger 1 when the engine is at idle and its axial position at the closing of supply port 3 by pump plunger 1. The length "l" of upper leading edge 15 of release slot 11 and the distance between pump plunger upper edge 13 and point 17 of second release groove 7 are determined in such a way that corner point 18 of release slot 11 in the low idle position of the engine comes into contact with the upper leading edge 14 of second release groove 7 precisely when the vertex 16 of supply port 3 is overlapped by pump plunger upper edge 13.

FIG. 5a shows the rotated position of pump plunger 1 for full load performance by the engine. The inclination of the slope of discharge outlet 8 and length "l" of upper leading edge 14 of second release groove 7 are chosen, or predetermined, so that release slot 11 and second release groove 7 do not actually overlap in the full load position of the plunger.

Figure 6:
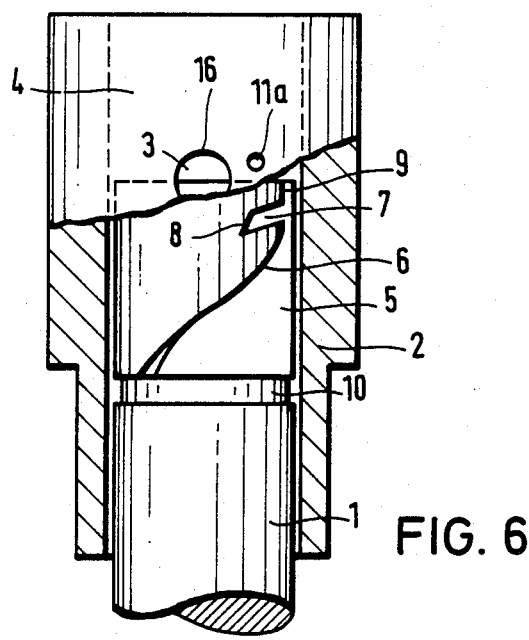
FIG. 6 is a view similar to FIG. 1 but showing a separate release borehole in the pump cylinder in place of the release slot in the supply port.

In FIG. 6 a pump plunger 1 is guided so it can be axially displaced or reciprocated in a pump plunger bushing 2. Pump plunger 1 is driven by a cam, not shown, sucks fuel from a release opening or supply port 3 and delivers fuel from a pump chamber 4 by means of a relief or delivery valve, not shown, to an injection valve, which is also not shown. On the pressure chamber end of pump plunger 1 a first release groove 5 is formed together with a leading control edge 6, a second release groove 7 and an axial groove 9. Axial groove 9 connects pump chamber 4 with an annular groove 10 and release grooves 5 and 7.

Figure 7:
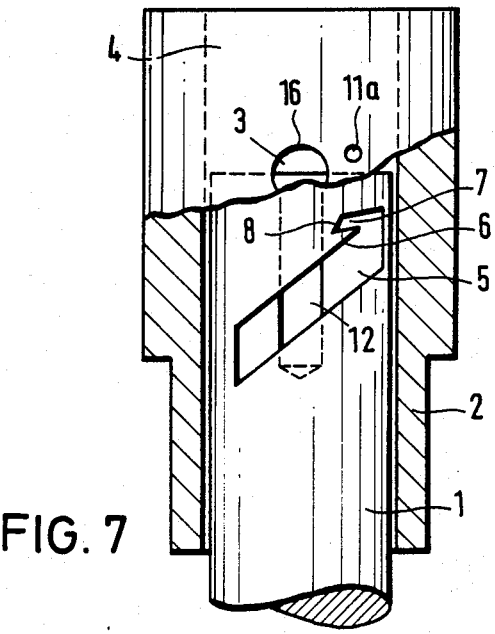
FIG. 7 is a view similar to FIG. 2 but like FIG. 6 showing a separate borehole in the pump cylinder in place of the release slot in the supply port.

In FIG. 7 a variation is represented for which the connection between the pump chamber 4 and the first and second release grooves 5, 7 is carried out by means of a central borehole 12 in plunger 1. In pump cylinder 2 an auxiliary release opening in the form of a release borehole 11a is arranged which is not connected to the supply port or main release opening 3.

Figure 8:
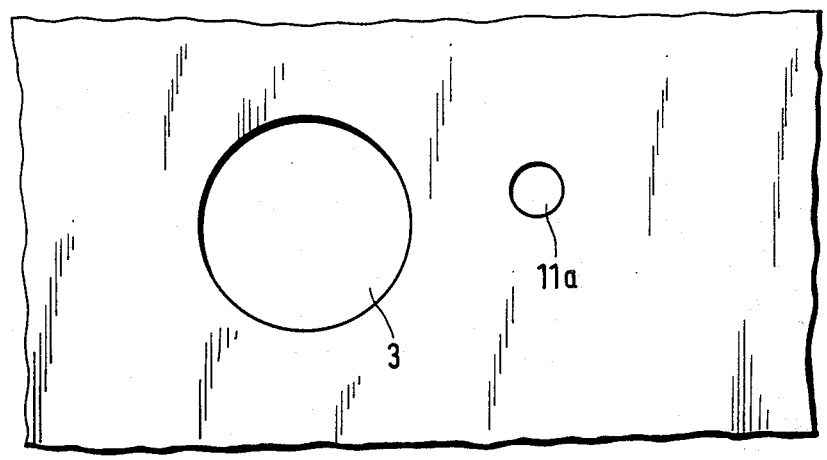
FIG. 8 is an enlarged partial side view of the pump cylinder showing the supply port and the release borehole.
Figure 8A:
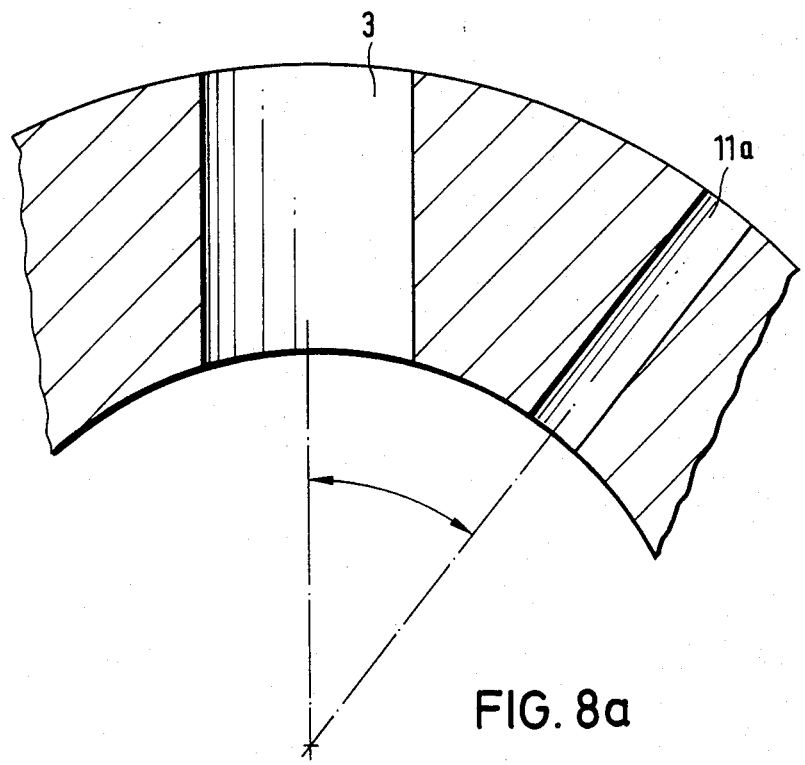
FIG. 8a is a partial cross-section through the pump cylinder showing the supply port and the release borehole.

FIGS. 8 and 8a show a supply port 3 and an independent release borehole 11a. Release borehole 11a is displaced relative to supply port 3 by a circumferential angle between 38 and 42 degrees. The diameter of release borehole 11a is 8 to 12 percent of the pump plunger diameter. The upper edge of release borehole 11a is below the upper edge of supply port 3.

Figure 9:
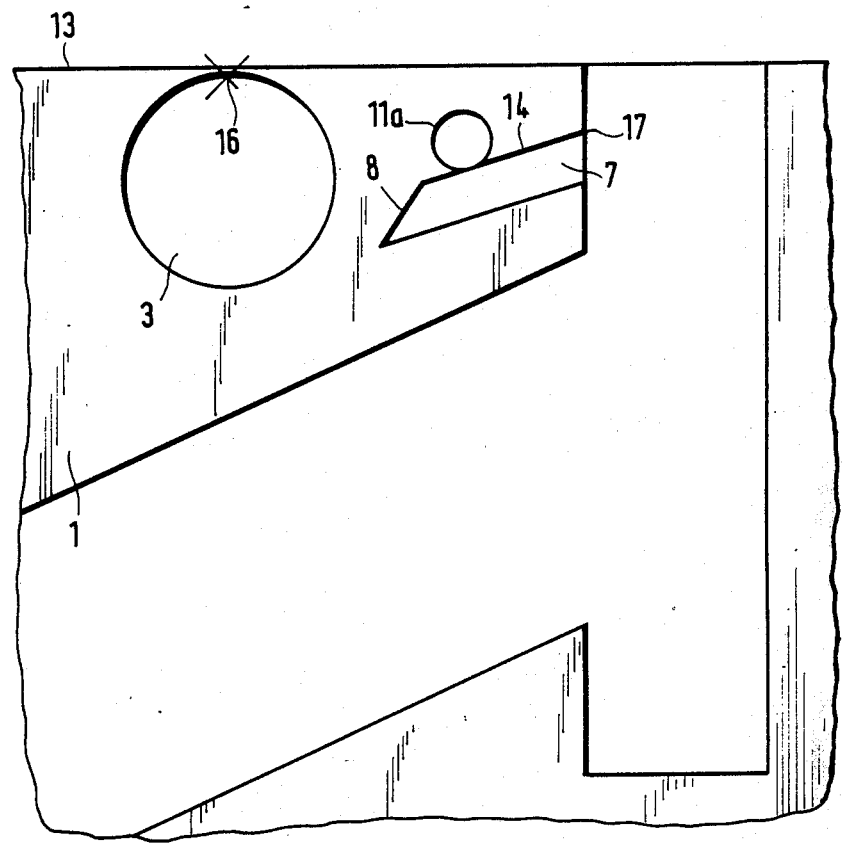
FIG. 9 is an enlarged side view of the pump plunger with the supply port and the release borehole superimposed thereon to show their positions relative to the release grooves when the pump plunger is rotated to its low idle setting.
Figure 9A:
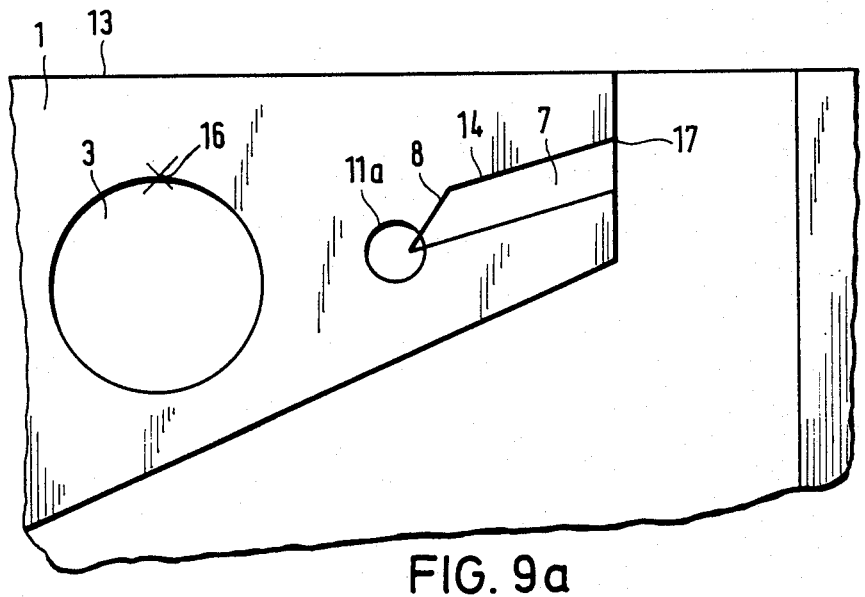
FIG. 9a is a view similar to FIG. 9 but showing the pump plunger rotated to its full load position and moved upwardly in its injection stroke.

Referring to FIGS. 9 and 9a, the selection of the distance from a point 17 of second release groove 7 from plunger upper edge 13 is dependent upon the angle and vertical position of second release groove 7 on the plunger and the position of supply port 3 in cylinder 2 relative to release borehole 11a. FIG. 9 shows the rotated position of pump plunger 1 when the engine is at low idle and its axial position during the closing of release opening 3 by pump plunger 1. The distance between pump plunger upper edge 13 and point 17 of second release groove 7 is determined in such a way that, when the engine is in low idle, upper leading edge 14 of second release groove 7 comes into contact with auxiliary release opening 11a precisely when the vertex of release opening 3 is overlapped by pump plunger upper edge 13.

FIG. 9a shows the rotated position of pump plunger 1 when the engine is at full load. The inclination of the slope of discharge outlet 8 and the length of upper leading edge 14 of second release groove 7 are chosen in such a way that second release groove 7 and release borehole 11a slightly overlap.

By sizing and positioning release borehole 11a in accordance with this invention, the same favorable engine results are achieved as when using auxiliary release opening in the form of release slot 11; however, release borehole 11a is markedly easier to fabricate.

OPERATION

During the upward movement of pump plunger 1 in pump cylinder 2, first supply port 3 and release slot 11, or the release borehole 11a, are closed. After the closing of supply port 3 during the delivery stroke of the plunger, the process of supplying fuel to the injector begins. This delivery process ends when leading edge 6 of first release groove 5 overlaps supply port 3.

The rotation of pump plunger 1 in combination with sloping leading edge 6 results in varying the fuel delivery strokes and thus in varying injection quantities.

When the pump plunger is rotated to its low idle position, as shown in FIGS. 1, 2, 5, 6, 7 and 9, which corresponds to supply the injection amount required by the engine at low idle speed, the overlapping of second release groove 7 with release slot 11, or release borehole 11a, begins after closing of supply port 3. Since the relatively small overlap area increases gradually, a small idle quantity of fuel is supplied to the injector until the overlap area is sufficiently great to release the pressure and interrupt the injection. After release groove 7 has completed the overlap of release groove 11, or release borehole 11a, the second interval of injection begins. The preinjection amount is determined in such a way that no disturbing combustion noise occurs while the preinjected fuel is burning.

An optimal design of the injection apparatus required for quiet combustion is achieved through the fact that second release groove 7 is formed between the partial angle inclined leading edge 6 and plunger upper edge 13. Since lower injection quantities are provided for low speeds than for higher speeds by the same plunger strokes, inclination of second release groove 7 also results in the realization of a greater preinjection quantity as engine speed is increased from low idle.

Discharge outlet 8 of second release groove 7 represented in FIG. 3 offers the advantage of simple fabrication. On the other hand, variations 8a and 8b make possible a particularly precise modulation of the injection process via the control rod setting and a precise adaptation to the control behavior of the individual engine.

In the variation represented in FIG. 3 lower leading edge 19a is parallel, or nearly parallel, to pump plunger upper edge 13. This construction provides a gradually decreasing interruption time as the pump plunger is rotated from its low idle delivery position to its full speed delivery position.

An additional advantage of this invention is that a variable delivery plunger for a noninterrupted injection can be modified by reworking the pump plunger to incorporate the preinjection feature of this invention. Thus, existing engines with an unacceptable level of engine noise can be subsequently acoustically improved.

The embodiments of the invention in which an exclusive property or privilege is claimed are defined as follows:

1. An injection pump for a diesel engine including a casing having a cylinder with a pump chamber (4) in which a rotatable and reciprocatable pump plunger (1) operates and to which fuel is supplied through a main release opening (3) during the intake stroke of the plunger (1) and from which fuel is release through said main release opening (3) near the end of the delivery stroke of plunger (1) via a first release groove (5) with a slanting control edge (6) in the outer cylindrical surface of the pump plunger, and with a second release groove (7) in said outer cylindrical surface between said first release groove (5) and the pump plunger upper edge (13) which in a specific rotational and axial position of pump plunger (1) registers with an auxiliary release opening in pump cylinder (2), whereby the upper edge (14) of said second release groove (7) inclines relative to said pump plunger upper edge (13) at an angle whose size is between one-half the size of the angle of inclination of upper edge (6) of said first release groove (5) relative to said plunger upper edge (13) and an angle which is 6 degrees greater than one-half said angle of inclination.

2. The injection pump of claim 1 wherein said second release groove (7) has a discharge outlet edge (8) at its end axially furthest from said plunger upper edge (13) which extends from its said upper edge (14) to its lower edge (19) at an angle between 35 degrees and 45 degrees relative to its said upper edge (14).

3. The injection pump of claim 2 wherein the upper and lower edges of said second release groove (7) are parallel and are spaced apart a distance which is from 5 to 7 percent of the diameter of the pump plunger, and wherein the depth and width of said second release groove (7) are substantially equal.

4. The injection pump of claim 2 wherein the lower edge (19) of said second release groove (7) is substantially parallel with said plunger upper edge (13).

5. The injection pump of claim 1 wherein said second release groove has a discharge outlet edge at its end axially furthest from said plunger upper edge (13) which extends in a predetermined curve between its upper edge (14) and its lower edge (19).

6. The injection pump of claim 5 wherein said second release groove has parallel upper and lower edges spaced a distance which is from 5 to 7 percent of the diameter of the pump plunger and wherein the depth of said second release groove is substantially the same as its width.

7. The injection pump of claim 5 wherein said lower edge (19) of said second release groove (7) is substantially parallel with said plunger upper edge (13).

8. The injection pump of claim 1 wherein the upper and lower edges of said second release groove are parallel to one another and are spaced apart a distance of between 5 and 7 percent of the diameter of said pump plunger.

9. The injection pump of claim 1 wherein the lower edge (19) of said second release groove (7) is substantially parallel with said plunger upper edge (13).

10. The injection pump of claim 1 wherein said auxiliary release opening is a release slot (11) which is rectangular, has the same width as the second release groove (7), is connected to said main release opening (3), is perpendicular to the axial direction of movement of said pump plunger (1) and is located below the highest point (16) of said main release opening (3), and wherein the lengths of the upper edges of the second release groove (7) and said release slot (11) are substantially equal.

11. The injection pump of claim 10 wherein said pump plunger is rotatable between full load and low idle positions, wherein the lengths of the upper edges of the release groove (7) and the release slot (11) are such that, in said full load position of said pump plunger (1), said second release groove (7) and said release slot (11) do not come into fluid communication with one another and in said low idle position of said pump plunger (1) the distance between the pump plunger upper edge (13) to the upper edge (14) of said second release groove (7) is such that when the plunger is reciprocated upwardly said second release groove (7) comes into fluid communication with said release slot (11) at the same time said upper edge (13) of the pump plunger (1) closes said main release opening (3).

12. The injection pump of claim 11 wherein said second release groove (7) has a discharge outlet edge (8) at its end axially furthest from said pump plunger (1) upper edge (13) which extends from its said upper edge (14) to its lower edge (19) at an angle between 35 degrees and 45 degrees relative to its said upper edge (14).

13. The injection pump of claim 12 wherein the upper and lower edges of said second release groove (7) are parallel and are spaced apart a distance which is from 5 to 7 percent of the diameter of the plunger.

14. The injection pump of claim 1 wherein said pump plunger (1) is rotatable between full load and low idle positions, wherein the locations of said upper edge (14) of said second release groove and said auxiliary release opening are such that in said full load position of said pump plunger (1) said second release groove (7) and said auxiliary release opening do not come into fluid communication with one another and in said low idle position of said pump plunger (1) said second release groove (7) comes into fluid communication with said auxiliary release opening at the same time said plunger upper edge (13) closes said main release opening (3) during the upward delivery stroke of said pump plunger (1).

15. The injection pump of claim 1 wherein the lower edge of said second release groove (7) is substantially parallel with said plunger upper edge and wherein said auxiliary release opening is a release slot (11) which is rectangular, is connected to said main release opening (3), is generally perpendicular to the axial direction of movement of said pump plunger (1) and is disposed below the highest point (16) of said main release opening (3).

16. The injection pump of claim 15 wherein the lengths of the upper edges of said release slot and said second release groove (7) are substantially equal.

17. The injection pump of claim 1 wherein said auxiliary release opening is a release borehole (11a) which is separate from said main release opening (3).

18. The injection pump of claim 17 wherein said release borehole (11a) is displaced relative to said main release opening (3) by the circumferential angle of from 38 to 42 degrees, wherein the diameter of said release borehole (11a) is from 8 to 12 percent of the diameter of said pump plunger (1) and wherein the upper edge of said release borehole (11a) is located below the upper edge of said main release opeming (3).

19. The injection pump of claim 18 wherein said pump plunger is rotatable between low idle and full load positions and wherein the length of said upper edge (14) of said second release groove (7) is great enough so that when said pump plunger (1) is rotated to said full load position an end tip of said second release groove (7) and said release borehole (11a) slightly overlap one another.

20. The injection pump of claim 17 wherein said pump plunger is rotatable between low idle and full load positions and wherein said main release opening (3), said release borehole (11), said plunger upper edge (13) and said upper edge of said second release groove (7) are so constructed and arranged that in said low idle position of said pump plunger (1) said second release groove (7) becomes tangent to said release borehole (11a) at the time said pump plunger upper edge (13) closes said main release opening (3).

21. The injection pump of claim 20 wherein the length of said upper edge of said second release groove (7) is great enough so that when said pump plunger (1) is rotated to said full load position an end tip of said second release groove and said release borehole (11a) slightly overlap one another.

22. The injection pump of claim 17 wherein said release borehole (11a) is substantially smaller than said main release opening (3) and the diameter of said release borehole (11a) is 8 to 12 percent of the diameter of said pump plunger.

* * * * *